April 16, 1946.  S. SYMONDS  2,398,728
SHOCK ABSORBER
Filed March 1, 1945
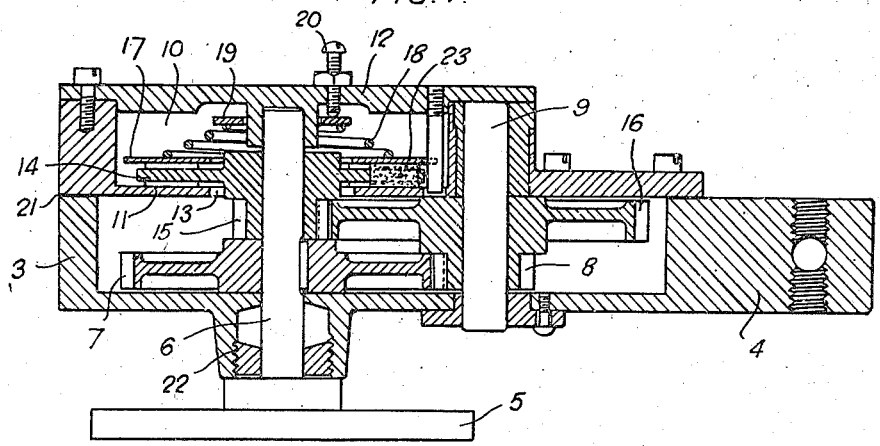
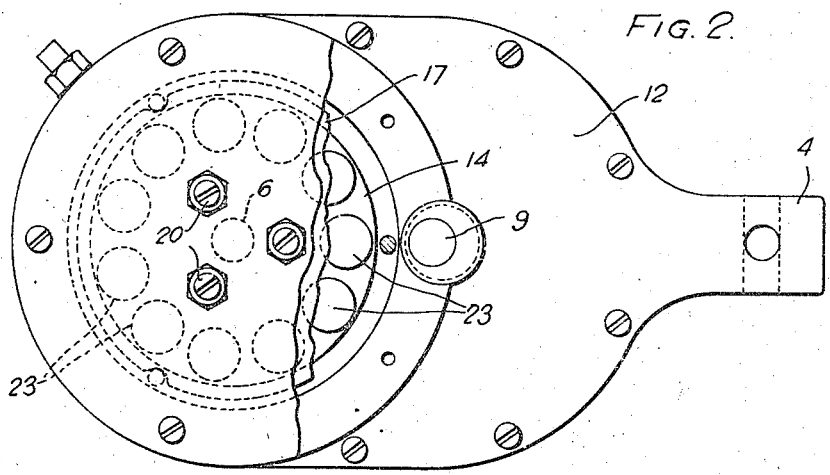
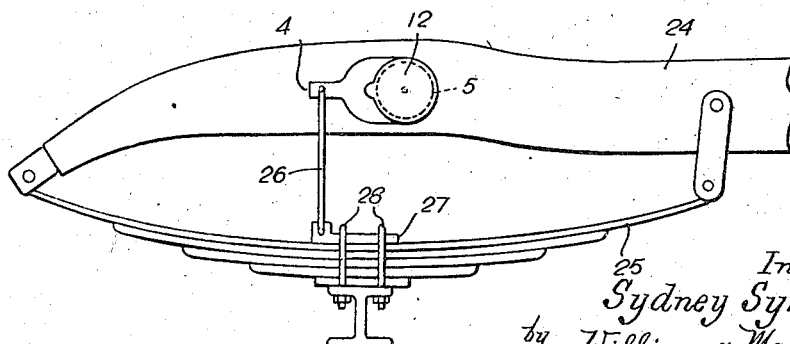
Inventor
Sydney Symonds
by Wilkinson & Mawhinney
Attorneys Patented Apr. 16, 1946

2,398,728

UNITED STATES PATENT OFFICE 2,398,728

SHOCK ABSORBER

Sydney Symonds, Harrow, England

Application March 1, 1945, Serial No. 580,302
In Great Britain February 15, 1944

3 Claims. (Cl. 188—130)

This invention relates to shock absorbers for vehicles and the like of the kind comprising two parts relatively movable and connected together by gearing in such a manner that when relative movement takes place the gearing brings into operation a braking means which resists the relative movement between the parts and so absorbs the shock.

An object of the invention is to provide a shock absorber which is adapted to be mounted on a vehicle at the front, rear, near-side or off-side and is thus of universal application to vehicles.

A further object of the invention is to provide a shock absorber which when used on a vehicle operates in an oscillatory manner but which can also be used with apparatus wherein it operates in a completely rotary manner.

According to the invention the device comprises a gear box having an arm adapted to be secured to one of the parts of the vehicle or the like and a plate carrying a spindle on which the gear box is pivotally mounted, said plate being adapted to be secured to the vehicle chassis or other desired part, a fixed pinion on the spindle gearing with a gear train mounted in the box and a friction disc rotatably mounted on the spindle between a fixed plate and a spring-pressed pressure plate, said disc carrying a pinion which gears with the aforesaid gear train.

When relative movement takes place between the gear box and its pivot, the gear train is operated and the friction disc is rotated between the aforesaid plates and so absorbs the shock.

The friction disc preferably comprises a disc having a series of holes therein into each of which a stud of cork, or cork composition or like suitable friction material is inserted, the studs projecting on both sides of the disc.

To enable the invention to be fully understood it will now be described by reference to the accompanying drawing, in which:

Fig. 1 is a sectional side elevation of a shock absorber constructed according to the invention, and Fig. 2 is a plan view thereof with part of the cover plate removed;

Fig. 3 is a view showing the shock absorber in position on part of a vehicle chassis.

As shown the device comprises a gear box 3 having an arm 4 adapted to be secured to one of the parts of the vehicle or the like, for example the axle, and a plate 5 carrying a spindle 6 on which the gear box is pivotally mounted, said plate 5 being adapted to be secured to the vehicle chassis or other desired part. The spindle 6 carries a fixed pinion 7 within the gear box which gears with a pinion 8 mounted on a spindle 9 in the box. A chamber 10 is provided in the box 3 by means of a wall 11, cut off from the aforesaid gearing and closed by a removable cover plate. The spindle 6 projects through an opening 13 in the wall 11, and a friction disc 14 is rotatably mounted on the part of the spindle within the chamber 10 and carries a fixed pinion 15 which projects through the opening 13 and meshes with a pinion 16 on the spindle 9 within the box.

The friction disc 14 is mounted between the wall 11 of the chamber and a spring-pressed pressure plate 17 which is fitted over the spindle 6 and is held in place by the cover plate 12. A spiral spring 18 is arranged between the pressure plate 17 and the cover plate 12. To adjust the pressure, a washer 19 is inserted between the spring 18 and the cover plate 12 and adjusting screws 20 are provided which pass through the cover plate into contact with the washer 19. In the arrangement shown the gear box 3 and the chamber 10 are formed in two parts, bolted together and a suitable gasket or seal 21 is provided between the parts so that the whole may be filled with lubricating oil, the spindle 6 passing into the gear box through a suitably packed gland 22. Other constructions are possible.

With the above described arrangement if relative movement between the gear box 3 and the plate 5 occurs the spring-pressed friction disc 14 is rotated by the gearing and so acts as a brake to absorb the shock. The friction disc 14 may be of any suitable kind. In the example shown the friction drive consists of the metal disc 14 having a series of apertures therein into each of which a stud of cork or cork composition 23 is inserted projecting on both sides of the disc so that in operation the cork or like faces make contact with the pressure plate 17 and the wall 11. The gear train driving the friction disc pinion 15 may be arranged to give any desired ratio between the rotation of the disc and the relative movement of the parts of the device.

Fig. 3 shows part of a vehicle chassis 24 with a supporting spring 25 and a shock absorber constructed according to the invention in position thereon. The plate 5 of the device is attached to the chassis frame 24 and the arm 4 is connected by a pivoted link 26 to a plate 27 secured to the spring 25 by the straps 28.

A shock absorbing device constructed according to the invention is universal in its application to vehicles as it can be fitted at the front, rear, near-side and off-side of a vehicle whereas the usual known type of shock absorbers are adapted for one only of the aforesaid positions. Further, when mounted on a vehicle the device operates in an oscillatory manner, but it is also capable of use on apparatus wherein it operates in a completely rotary manner.

While the device according to the invention is particularly adapted for use with motor road vehicles its application is not limited thereto as will be understood.

I claim:

1. A shock absorbing device comprising a plate adapted to be attached to part of a structure, a spindle on the plate, a gear box pivotally mounted on the spindle, an arm attached to the gear box for attachment to another part of a structure, a fixed partition plate in the gear box through which the spindle passes, a friction disc rotatable on the spindle on the side of the partition plate remote from the plate carrying the spindle, a pressure plate on the spindle, a spring bearing on the pressure plate to force it against the friction disc, means for adjusting the spring pressure, a pinion on the friction disc projecting through a hole in the partition plate, a stub shaft in the gear box, a pinion on the stub shaft gearing with a pinion on the friction wheel, a second pinion on the stub shaft, and a pinion secured to the spindle and gearing with the aforesaid second pinion on the stub shaft.

2. A shock absorbing device as claimed in claim 1 having a coil spring pressing on the friction disc, a plate resting on the spring and a screw passing through the gear box and engaging the plate to enable the pressure of the spring to be adjusted.

3. A shock absorbing device as claimed in claim 1 having a friction disc rotatably mounted on the spindle within the gear box and a series of studs of friction material mounted on the friction disc and projecting on both sides thereof.

SYDNEY SYMONDS.